US012676127B2

(12) United States Patent
Kaku

(10) Patent No.: US 12,676,127 B2
(45) Date of Patent: Jul. 7, 2026

(54) CONTROL APPARATUS AND NON-TRANSITORY COMPUTER READABLE MEDIUM

(71) Applicant: TOYOTA JIDOSHA KABUSHIKI KAISHA, Aichi-ken (JP)

(72) Inventor: Wataru Kaku, Musashino (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 138 days.

(21) Appl. No.: 18/638,672

(22) Filed: Apr. 18, 2024

(65) Prior Publication Data

US 2024/0355310 A1    Oct. 24, 2024

(30) Foreign Application Priority Data

Apr. 21, 2023    (JP) ................................. 2023-070451

(51) Int. Cl.
G09G 5/38        (2006.01)
G06F 3/14        (2006.01)
G06T 7/20        (2017.01)
G06T 7/60        (2017.01)

(52) U.S. Cl.
CPC ................. G09G 5/38 (2013.01); G06F 3/14 (2013.01); G06T 7/20 (2013.01); G06T 7/60 (2013.01); *G09G 2340/0464* (2013.01)

(58) Field of Classification Search
CPC ................ G09G 5/38; G06F 3/14; G06T 7/20
See application file for complete search history.

(56) References Cited

U.S. PATENT DOCUMENTS

| | | | | |
|---|---|---|---|---|
| 2004/0179714 A1* | 9/2004 | Jouppi | ..................... | H04N 7/15 |
| | | | | 348/E7.083 |
| 2013/0194394 A1 | 8/2013 | Shintani | | |
| 2017/0060319 A1* | 3/2017 | Seo | ........................ | G06F 3/0481 |
| 2020/0027135 A1* | 1/2020 | Fernandez | ......... | G06Q 30/0271 |
| 2020/0117414 A1* | 4/2020 | Murakawa | ................ | G06T 7/70 |
| 2022/0079694 A1* | 3/2022 | Freiin Von Kapri | .... | B25J 13/06 |
| 2022/0291742 A1* | 9/2022 | Otsuka | ..................... | G09G 5/36 |

FOREIGN PATENT DOCUMENTS

| | | |
|---|---|---|
| JP | 2006-060350 A | 3/2006 |
| JP | 2008-199514 A | 8/2008 |
| JP | 2015-513687 A | 5/2015 |
| JP | 6962439 B1 | 11/2021 |

* cited by examiner

*Primary Examiner* — Yi Yang
(74) *Attorney, Agent, or Firm* — HAUPTMAN HAM, LLP

(57)        ABSTRACT

A control apparatus includes a display having a display area for displaying images, an imager configured to capture an image of a plurality of users around the display area, and a controller configured to raise or lower a position of the display area to a height corresponding to a representative eye height of the plurality of users based on the image captured by the imager.

19 Claims, 4 Drawing Sheets

FIG. 4

CONTROL APPARATUS AND NON-TRANSITORY COMPUTER READABLE MEDIUM

CROSS-REFERENCE TO RELATED APPLICATION

This application claims priority to Japanese Patent Application No. 2023-070451, filed on Apr. 21, 2023, the entire contents of which are incorporated herein by reference.

TECHNICAL FIELD

The present disclosure relates to a control apparatus and a program for a control apparatus.

BACKGROUND

Various image display apparatuses for displaying images to users are known. For example, Patent Literature (PTL) 1 discloses a television viewing system that adjusts the position of the display according to the user's eye height.

CITATION LIST

Patent Literature

PTL 1: JP 2006-060350 A

SUMMARY

There is room for improving user convenience in image display apparatuses that adjust the position of the display to match the user.

Below, we disclose a control apparatus and the like that can adjust the display position of images to improve user convenience.

A control apparatus in the present disclosure includes:

a display having a display area for displaying images;

an imager configured to capture an image of a plurality of users around the display area; and a controller configured to raise or lower a position of the display area to a height corresponding to a representative eye height of the plurality of users based on the image captured by the imager.

A program for a control apparatus in the present disclosure is a program to be executed by a control apparatus including a display having a display area for displaying images and an imager configured to capture an image of a plurality of users around the display area, the program causing the control apparatus to:

raise or lower a position of the display area to a height corresponding to a representative eye height of the plurality of users based on the image captured by the imager.

According to the control apparatus and the like in the present disclosure, the display position of images can be adjusted to improve user convenience.

BRIEF DESCRIPTION OF THE DRAWINGS

In the accompanying drawings:

FIG. 4 is a diagram illustrating a reference area.

DETAILED DESCRIPTION

Embodiments are described below.

Figure 1:
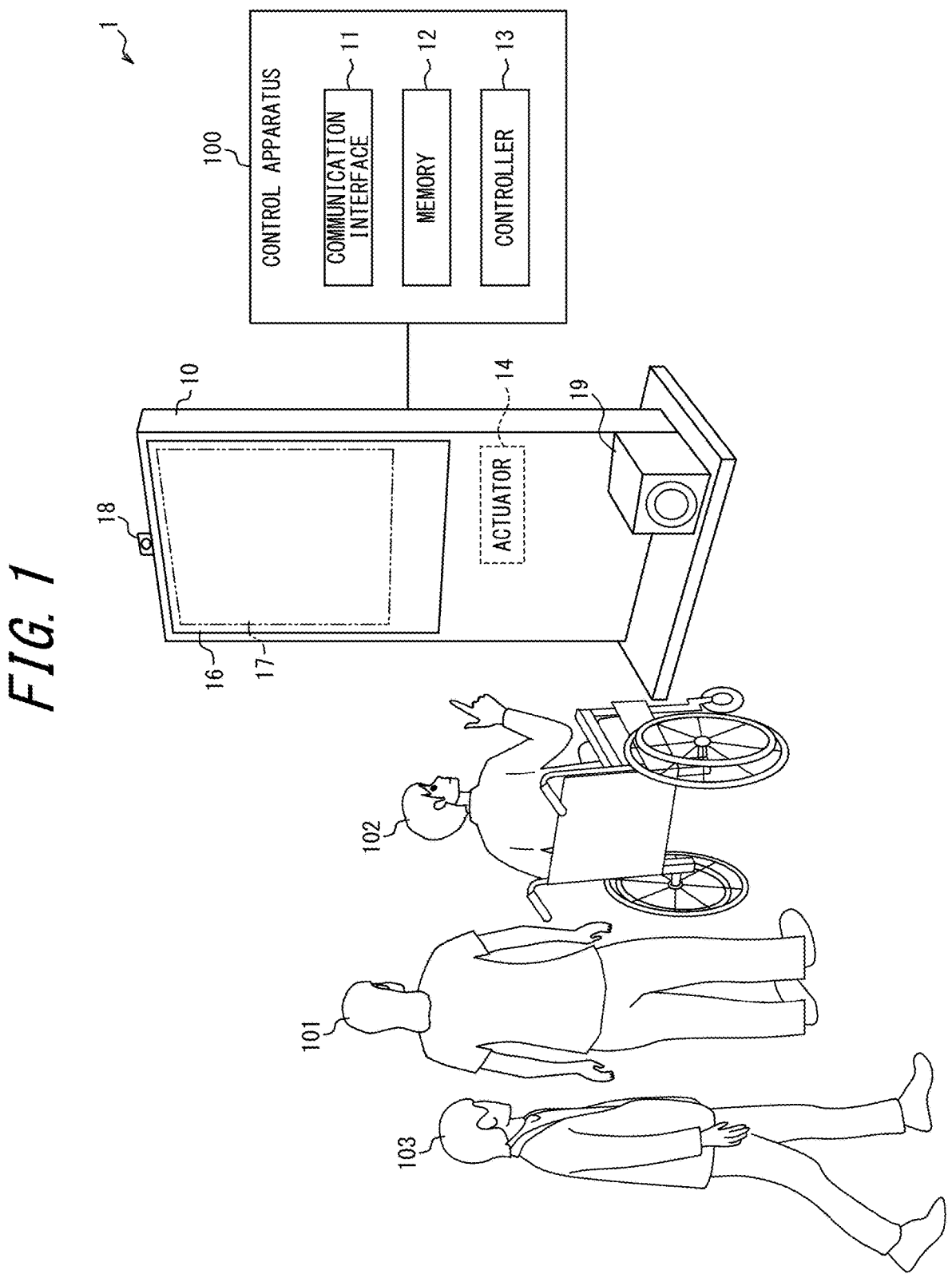
FIG. 1 is a diagram illustrating an example configuration of a control apparatus.

FIG. 1 illustrates an example of the configuration and use of a control apparatus in the present embodiment.

An image display apparatus 1 includes a display input apparatus 10 and a control apparatus 100 that is connected to the display input apparatus 10 in a manner enabling the exchange of various information. The configuration including the display input apparatus 10 and the control apparatus 100 corresponds to the "control apparatus" in the present embodiment.

The display input apparatus 10 includes a display input interface 16, an imager 18, and an audio output interface 19. The display input apparatus 10 may further include an actuator 14.

The display input interface 16 is a touch display integrally configured by a display for displaying images and a touch panel, superimposed on the display, for accepting touch operations. The display is, for example, a Liquid Crystal Display (LCD) or an organic Electro Luminescent (EL) display. The display input interface 16 may have any dimensions and size. For example, the display input interface 16 may have a size of approximately 100 cm high by 50 cm wide. This size and aspect ratio is only an example, and the values indicated here are not limiting. The display input interface 16 includes a display input area 17 that displays images for display and a graphical user interface (GUI) for operation. The display input area 17 may span the entire area of the touch display or a portion thereof. The display input interface 16 displays various images and the GUI on the display input area 17 under the control of the control apparatus 100, receives operations on the display input area 17 from the user, and transmits input information corresponding to the operations to the control apparatus 100. The display input area 17 is configured to be raised and lowered under the control of the control apparatus 100. The display input area 17 may be raised or lowered by the display input interface 16 itself being driven by the actuator 14 to rise or lower, or the position where the display input area 17 is formed as an image in the display input interface 16 may be raised or lowered by software processing. The display input area 17 corresponds to the "display area" or "input area".

The actuator 14 includes any appropriate mechanism to move the display input interface 16 up and down while supporting the display input interface 16. The actuator 14 includes, for example, a guide mechanism that guides the display input interface 16 while supporting the raising and lowering of the display input interface 16, a motor that serves as the power source for raising and lowering, and a gear mechanism that transmits the power from the motor to the display input interface 16. The actuator 14 operates under the control of the control apparatus 100.

The imager 18 is provided at a position and angle that enable imaging of the users of the display input apparatus 10. The imager 18 can be provided at any location, such as above the display input interface 16 in the display input apparatus 10, or may be provided within the environment in which the display input apparatus 10 is installed. The imager 18 includes a visible-light camera that captures an image of a subject using visible light, a distance measuring sensor that measures the distance to the subject to acquire a distance image, and a control circuit for the camera and sensor. Distance measurement sensors include Time Of Flight (ToF) cameras, Light Detection And Ranging (LiDAR) sensors, and stereo cameras and generate distance images of a subject that contain distance information. The imager 18 transmits the captured images and the distance images to the control apparatus 100.

The audio output interface 19 includes a speaker that outputs audio to the user and a control circuit for the speaker. The audio output interface 19 can be provided at any location, such as around the display input interface 16 in the display input apparatus 10, or may be provided within the environment in which the display input apparatus 10 is installed. The audio output interface 19 outputs audio in response to audio signals transmitted from the control apparatus 100.

The control apparatus 100 may be integrally configured with the display input apparatus 10 or may be configured as a separate information processing apparatus capable of communicating with the display input apparatus 10. The control apparatus 100 includes a communication interface 11, a memory 12, and a controller 13.

The image display apparatus 1 as a control apparatus in the present embodiment includes the display input interface 16, which is a display including the display input area 17 as a display area for displaying images, the imager 18, which is configured to capture an image of a plurality of users 101, 102, 103 around the display input area 17, and the controller 13 that raises or lowers the position of the display input area to a height (hereinafter referred to as the optimal height) corresponding to a representative eye height of the plurality of users 101, 102, 103 based on the image captured by the imager 18. The eye height is the height from the ground or floor to the position of the user's eyes and varies according to the height of the user. The eye height also varies according to the user's posture. For example, as illustrated in FIG. 1, the eye height of the standing users 102, 103 is higher than the eye height of the user 101 sitting in a wheelchair. When the height and posture (such as standing or sitting) vary for an unspecified number of users (i.e., the number of users is any number, one or more, and is not specified) who come and go, the eye height also varies widely. The controller 13 raises or lowers the display input area 17 to a height corresponding to a representative eye height of the users 101, 102, 103 detected from the captured image. With this configuration, the position of the image display for the users can be optimized. The display position of images can therefore be adjusted to improve user convenience.

The configuration of each component of the control apparatus 100 will be described.

The communication interface 11 includes one or more interfaces for communication. The interface for communication is, for example, a Local Area Network (LAN) interface. The control apparatus 100 is connected by the communication interface 11 to a network including a LAN and the Internet and transmits and receives various types of information.

The memory 12 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EE-PROM). The memory 12 stores information to be used for the operations of the controller 13 and information obtained by the operations of the controller 13.

The controller 13 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 13 executes information processing related to operations of the control apparatus 100 while controlling components of the control apparatus 100.

Figure 2:
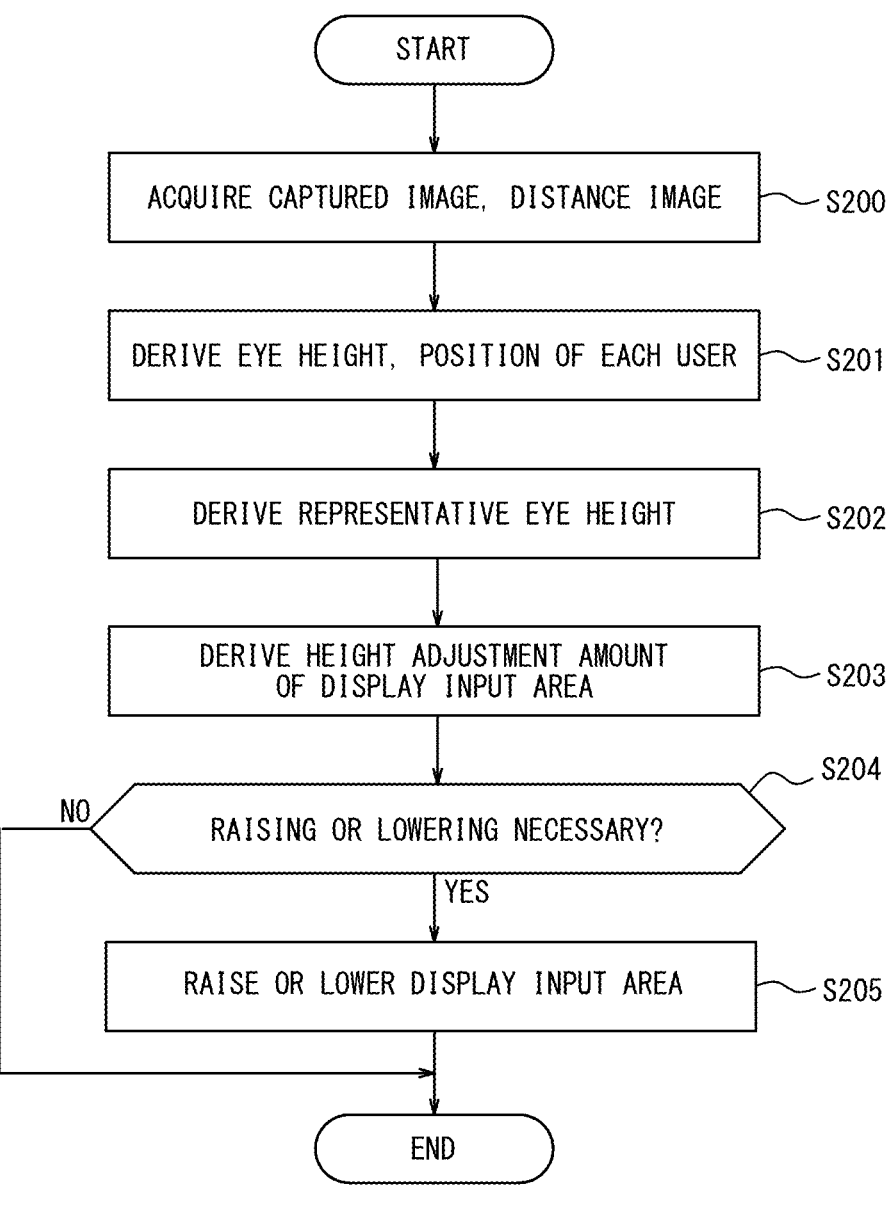
FIG. 2 is a flowchart illustrating an example of operations of the control apparatus.

FIG. 2 is a flowchart illustrating operation procedures of the image display apparatus 1. The procedures illustrated here are executed by the controller 13 at a freely set cycle. The cycle is, for example, from several milliseconds to several seconds.

In step S200, the controller 13 acquires captured images and distance images. The imager 18 captures images of the surroundings of the image display apparatus 1, along with distance images, at a freely set frame rate. The controller 103 acquires the captured images and the distance images from the imager 18.

In step S201, the controller 13 derives the eye height and position of each user based on the captured images. The controller 13 detects users from the captured images by image processing such as pattern recognition and further detects each user's eyes. The controller 13 uses the distance images to derive the distance and direction from the imager 18, for each of one or more detected users, at the position of the center of the eyes, for example. The controller 13 then derives the spatial coordinates of each user and each user's eyes using information, stored in the memory 12 in advance, on the spatial coordinates of the imager 18. Here, the eye height is specified by vertical coordinates relative to the ground or floor.

In step S202, the controller 13 derives the representative eye height. The representative eye height is the average of the eye heights. The controller 13 derives the average of the users' eye heights (hereinafter referred to as the average eye height) using the coordinate information for the display input area 17 that is stored continually in the memory 12.

Figure 3:
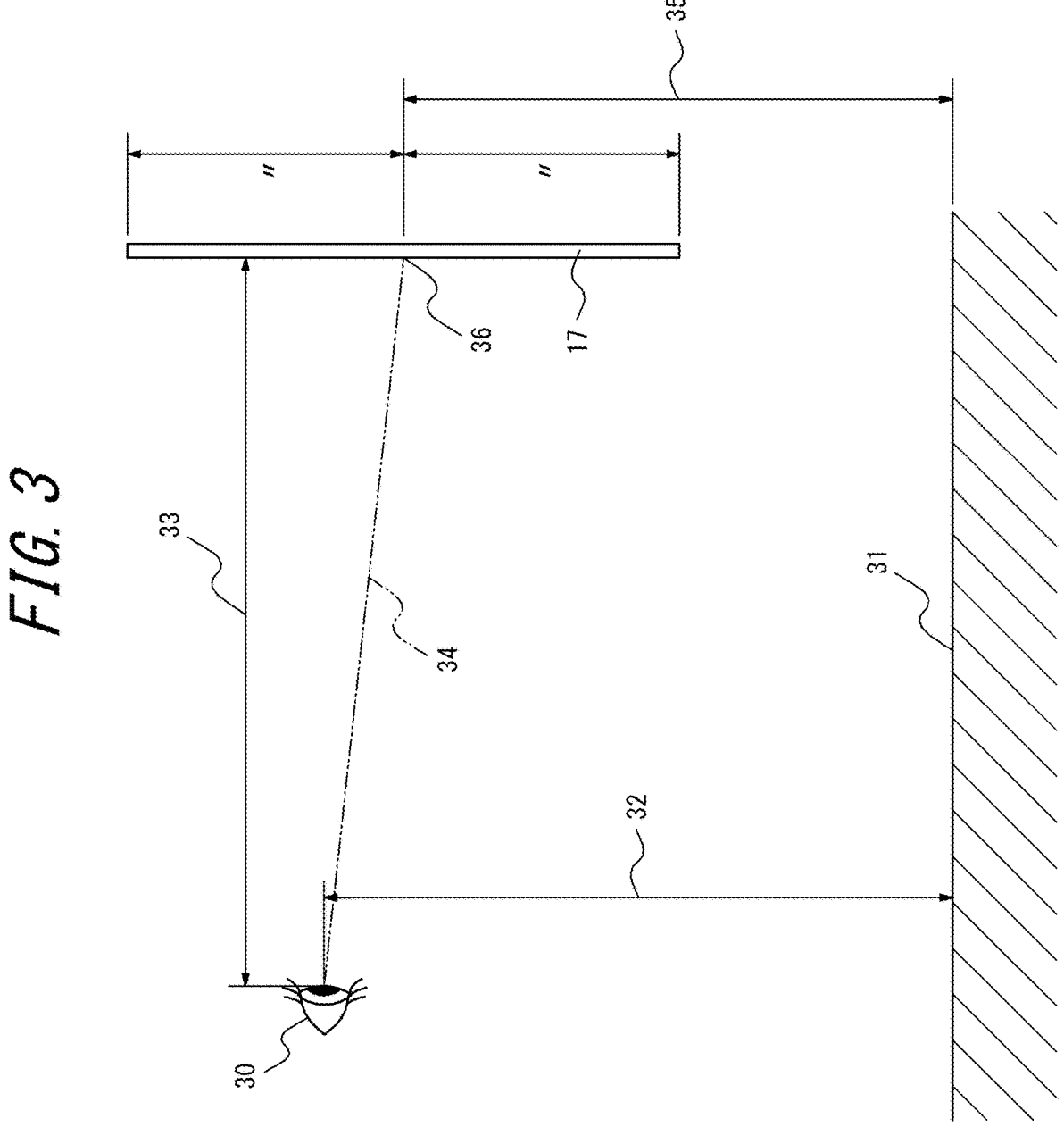
FIG. 3 is a diagram illustrating eye height.

In step S203, the controller 13 derives a height adjustment amount for the display input area 17. The controller 13 derives the distance of each user from the display input area 17 using the coordinate information for the display input area 17 that is stored continually in the memory 12 and derives the average of the distances (hereinafter referred to as the average distance). The distance from the display input area 17 is, for example, the distance from the center of each user's eyes to the display surface of the display input area 17. The controller 13 derives the height (hereinafter referred to as the optimal height) of the display input area 17 that optimally corresponds to the average eye height at the average distance. The height of the display input area 17 is, for example, specified by the height of its vertical center. As illustrated in FIG. 3, the optimal height 35 of the vertical center 36 of the display input area 17 relative to the ground 31 corresponds, for example, to a direction 34 that is 10 to 15 degrees below the average eye height 30 at the average distance 33. The controller 13 then derives the difference between the current height of the display input area 17 stored in the memory 12 and the optimal height as the height adjustment amount by which to raise or lower the display input area 17.

Figure 4:
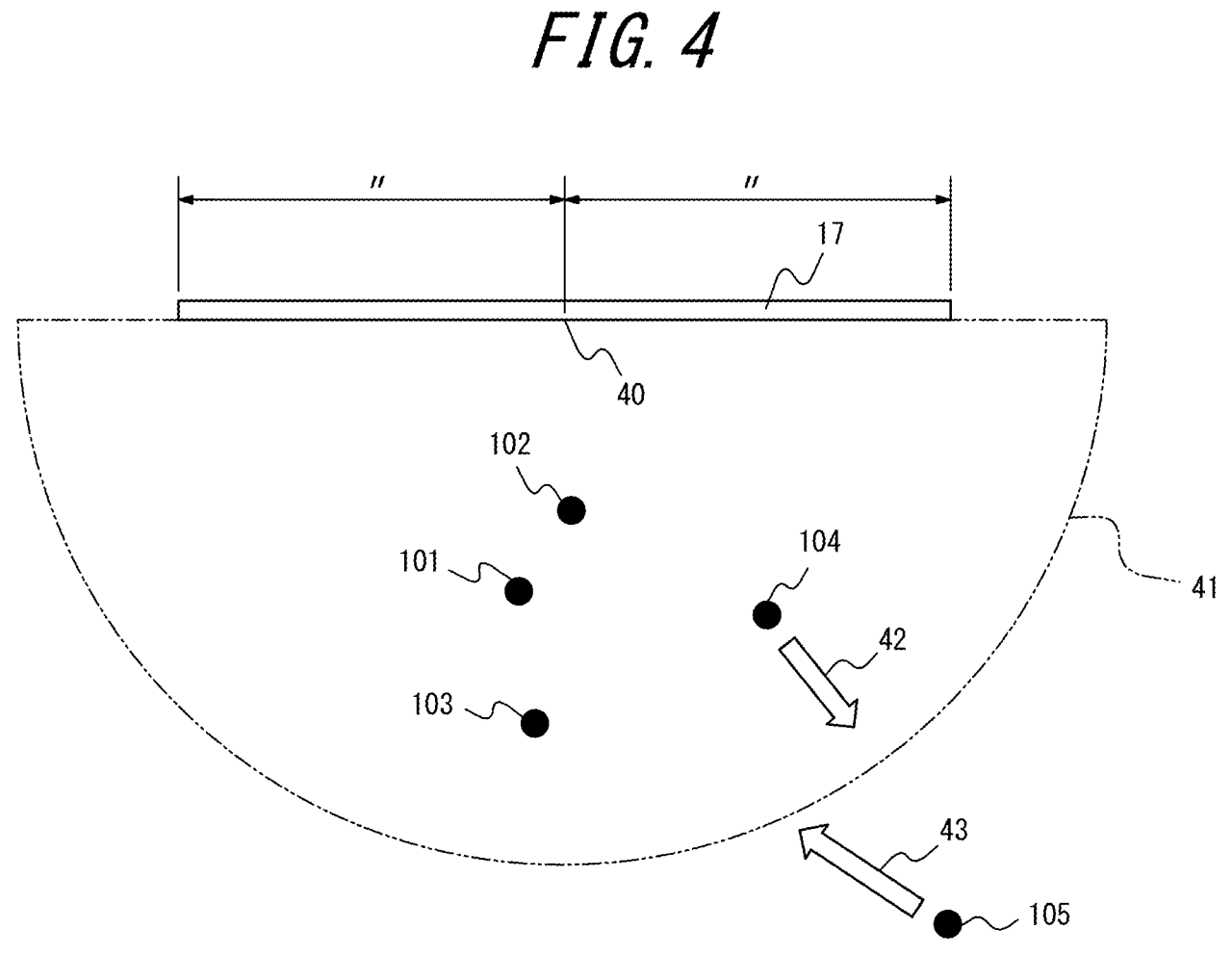

In a case in which an image of a plurality of users is captured, the controller 13 may pick the users to be targeted for deriving the average distance and average eye height. For example, the controller 13 can target only users located within any appropriate reference area relative to the display input area 17. The controller 13 may also derive the user's movement speed from the change over time in the captured images, add to the target users who approach the reference area at a freely chosen speed or faster, or exclude from the target users who move away from the display input area 17 at a freely chosen speed or faster despite being within the reference area. For example, as illustrated in FIG. 4, when users 101, 102, 103 are included in a reference area 41 having a freely chosen radius (such as several tens of centimeters to several meters) centered at the lateral center 40 of the display input area 17 in plan view of the display input area 17, the users 101, 102, 103 are targeted. Furthermore, a user 105 approaching the reference area 41 at a speed equal to or greater than a freely chosen speed may be added to the calculation target. At this time, when the distance between the position of the user 105 and the center 40 of the reference area 41 diminishes with time, for example, the user 105 is determined to be approaching the reference area 41. Alternatively, a user 104 moving away from the display input area 17 at a speed equal to or greater than a freely chosen speed may be excluded from the calculation target, despite being within the reference area 41. At this time, when the distance between the position of the user 104 and the center 40 of the reference area 41 increases with time, for example, the user 104 is determined to be moving away from the reference area 41. Alternatively, when a moving user performs a predetermined action, the controller 13 may add the user to the target, regardless of the direction or speed of movement. The predetermined action is an action detected by image recognition, such as turning the head to face the display input area 17. The optimal height can thus be derived while targeting users who are substantially viewing the displayed image. This contributes to user convenience.

Furthermore, when deriving the average eye height, the controller 13 may assign a greater weight as the user's eye height is lower and a greater weight as the distance of the user from the display input area 17 is closer. This can reduce unfairness by giving priority to users who are relatively short or are seated and who are therefore blocked by other users from viewing the image.

Furthermore, the controller 13 may assign greater weight to the eye height of a user who is performing an input operation on the display input area 17. The controller 13 can use any appropriate algorithm to determine whether a user operation is being accepted. The controller 13 determines that an operation is being accepted in a case in which an input corresponding to an operation is acquired from the display input area 17 and determines that an operation is not being accepted in a case in which no such input is acquired. The case of acquiring input includes the case of being within a freely chosen reference time (such as several seconds to over ten seconds) from the most recent input. It can also be determined whether operation input is being accepted according to the transition status of the GUI, as acquired from the display input area 17. For example, in a case in which a hierarchical menu screen is displayed as a GUI, it can be determined that operation input is not being accepted in the case of the top level, whereas it can be determined that operation input is being accepted in the case of a level lower than the top level, since the probability that an operation is in progress is high. Alternatively, the controller 13 may detect user behavior from the change over time in the captured images and determine whether operation input is being accepted according to the behavior. For example, it can be determined that operation input is being accepted in a case in which the orientation of the head of the user nearest to the display input area 17 is fixed for several seconds while facing the display input area 17. Higher priority can thus be given to users who are performing an operation than to users who are not performing an operation, thereby contributing to the convenience of users who are performing an operation.

In step S204, the controller 13 determines whether the display input area 17 needs to be raised or lowered. In a case in which the height adjustment amount is equal to or greater than a freely set reference (such as 2 to 5 cm), the controller 13 determines that raising or lowering is necessary (Yes) and proceeds to step S205. In a case in which the height adjustment amount is less than the reference, i.e., the current height of the display input area 17 is approximately the same as the optimal height (No), the present procedure terminates without raising or lowering of the display input area 17.

In step S205, the controller 13 raises or lowers the display input area 17. For example, the controller 13 instructs the actuator 14 to operate according to the height adjustment amount and raise or lower the display input area 17 together with the display input interface 16. Alternatively, the controller 13 transmits information to the display input interface 16 to display an image in which the display position of the display input area 17 is moved according to the height adjustment amount, thereby moving the display input area 17 on the display input interface 16.

By repetition of steps S200 to S205, the display input area 17 is raised or lowered to a height corresponding to the optimal height.

According to the above embodiment, the position of the display input area 17 can be optimized for an unspecified user. The display position of images can therefore be adjusted to improve user convenience.

The average eye height has been used above as the representative eye height, but the representative eye height may be a value other than the average, such as the median or mode.

In the above embodiment, a processing/control program that specifies operations of the controller 13 of the control apparatus 100 may be downloaded from a server apparatus capable of communication via a network and may be stored on a readable recording/storage medium, and the control apparatus 100 may read the processing/control program from the medium.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A control apparatus, comprising:
a display having a display area for displaying images;
an imager configured to capture an image of a plurality of users around the display area; and
a controller configured to raise or lower a position of the display area to a height corresponding to a representative eye height of the plurality of users based on the image captured by the imager, wherein
the height corresponding to the representative eye height is a height of a vertical center of the display area relative to the ground, which corresponds to a direction that is predetermined degrees below the representative eye height at an average distance, the average distance is an average of distances from the plurality of users to the display area, the controller is configured to assign to each user of the plurality of users a weight that decreases according to a height of the corresponding user, and determine the representative eye height by taking into account the weight, and the weight decreases as the height of the corresponding user is higher.

2. The control apparatus according to claim 1, wherein the controller is configured to determine the representative eye height for a target that includes the plurality of users included in a reference area around the display area.

3. The control apparatus according to claim 2, wherein when determining the representative eye height, the controller is configured to add to the target a user who moves inside the reference area from outside the reference area, and exclude from the target a user who moves outside the reference area from inside the reference area.

4. The control apparatus according to claim 2, wherein when determining the representative eye height, the controller is configured to add to the target a user who performs a predetermined action.

5. The control apparatus according to claim 4, wherein the predetermined action includes turning of a head of the user to face the display area.

6. The control apparatus according to claim 1, wherein the controller is configured to assign to each user of the plurality of users a further weight that decreases according to a distance from the corresponding user to the display area, and determine the representative eye height by taking into account the further weight.

7. The control apparatus according to claim 6, wherein the further weight decreases as the distance from the corresponding user to the display area is larger.

8. The control apparatus according to claim 1, further comprising:

an input area configured to accept an operation for the display area by any user in the plurality of users, wherein the controller is configured to determine the representative eye height by taking into account a further weight for each user of the plurality of users according to a state of operation with respect to the control apparatus.

9. The control apparatus according to claim 1, wherein the height of the vertical center of the display area is lower as the average distance increases.

10. The control apparatus according to claim 1, wherein the predetermined degrees are 10 to 15 degrees.

11. The control apparatus according to claim 1, further comprising:

an actuator configured to raise or lower the display, wherein the controller is configured to raise or lower the position of the display area by instructing the actuator to raise or lower the display area together with the display.

12. The control apparatus according to claim 1, wherein the controller is configured to raise or lower the position of the display area by transmitting, to the display, information causing the display to display the images in which the position of the display area is raised or lowered.

13. The control apparatus according to claim 1, wherein the representative eye height is an average of eye heights of the plurality of users.

14. A non-transitory computer readable medium storing a program to be executed by a control apparatus comprising a display having a display area for displaying images and an imager configured to capture an image of a plurality of users around the display area, the program causing the control apparatus to:

raise or lower a position of the display area to a height corresponding to a representative eye height of the plurality of users based on the image captured by the imager, wherein the height corresponding to the representative eye height is a height of a vertical center of the display area relative to the ground, which corresponds to a direction that is predetermined degrees below the representative eye height at an average distance, the average distance is an average of distances from the plurality of users to the display area, the control apparatus assigns to each user of the plurality of users a weight that decreases according to a height of the corresponding user, and determines the representative eye height by taking into account the weight, and the weight decreases as the height of the corresponding user is higher.

15. The non-transitory computer readable medium according to claim 14, wherein the control apparatus determines the representative eye height for a target that includes the plurality of users included in a reference area around the display area.

16. The non-transitory computer readable medium according to claim 15, wherein when determining the representative eye height, the control apparatus adds to the target a user who moves inside the reference area from outside the reference area, and excludes from the target a user who moves outside the reference area from inside the reference area.

17. The non-transitory computer readable medium according to claim 15, wherein when determining the representative eye height, the control apparatus adds to the target a user who performs a predetermined action.

18. The non-transitory computer readable medium according to claim 14, wherein the control apparatus assigns to each user of the plurality of users a further weight that decreases according to a distance from the corresponding user to the display area, and determines the representative eye height by taking into account the further weight.

19. The non-transitory computer readable medium according to claim 15, wherein the control apparatus further comprises an input area configured to accept an operation for the display area by any user in the plurality of users, and the control apparatus determines the representative eye height by taking into account a further weight for each user of the plurality of users according to a state of operation with respect to the control apparatus.

* * * * *